United States Patent [19]

Komuro

[11] Patent Number: 4,732,819
[45] Date of Patent: Mar. 22, 1988

[54] LIGHT-WEIGHT VEHICLE FRAME STRUCTURE

[75] Inventor: Katsusuke Komuro, Tokyo, Japan

[73] Assignee: Honda Giken Kogyo Kabushiki Kaisha, Tokyo, Japan

[21] Appl. No.: 864,019

[22] Filed: May 16, 1986

Related U.S. Application Data

[63] Continuation of Ser. No. 607,616, May 7, 1984, abandoned.

[30] Foreign Application Priority Data

May 7, 1983 [JP] Japan .............................. 58-79957[U]

[51] Int. Cl.4 ............................................. B60R 21/13
[52] U.S. Cl. .................................... 428/582; 138/156;
138/DIG. 11; 280/785; 280/797; 280/798;
296/29; 296/205; 428/586
[58] Field of Search ................. 296/29, 205; 280/785,
280/797, 798; 428/582, 586; 138/156, DIG. 11;
29/157.3 B, 157.3 C; 228/144, 150; 52/690,
693, 694, 731; 72/368, 379; 165/183

[56] References Cited

U.S. PATENT DOCUMENTS

| | | | |
|---|---|---|---|
| 1,608,905 | 11/1926 | Murray et al. | 29/157.3 C |
| 2,411,226 | 11/1946 | Pehrson | 296/205 |
| 3,005,242 | 10/1961 | Roberts | 52/690 |
| 3,177,935 | 4/1965 | Rosman | 29/157.3 C |
| 3,280,523 | 10/1966 | Stroud et al. | 52/731 |
| 4,045,075 | 8/1977 | Pulver | 296/205 |
| 4,428,420 | 1/1984 | Blakely | 165/183 |

Primary Examiner—L. Dewayne Rutledge
Assistant Examiner—Robert L. McDowell
Attorney, Agent, or Firm—Lyon & Lyon

[57] ABSTRACT

A light-weight vehicle frame structure formed by plural tubular structural members which each have a tubular body and a flange integral with the tubular body and extending along the entire length thereof and outwardly of the tubular body, and a plate connected to the flanges of one or more of tubular structural members to reinforce and join them. The tubular body may be round, square or any other shape and the flange may extend radially or tangentially in various embodiments. The plate is bent, cut and formed for the edges to be coplanar with the flanges to which they are attached.

9 Claims, 18 Drawing Figures

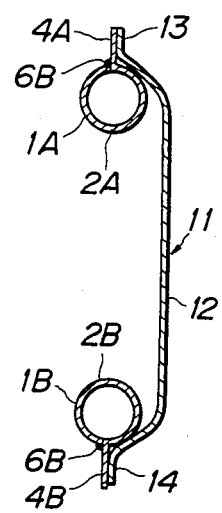
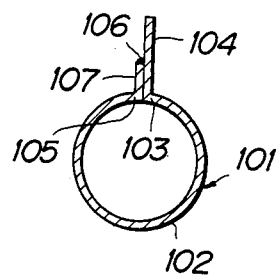
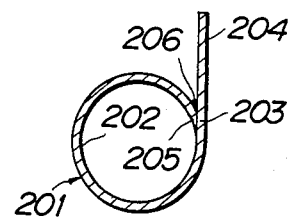
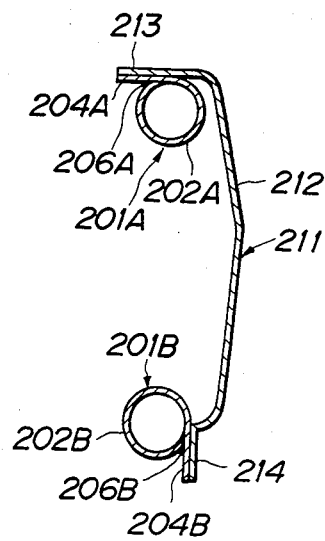
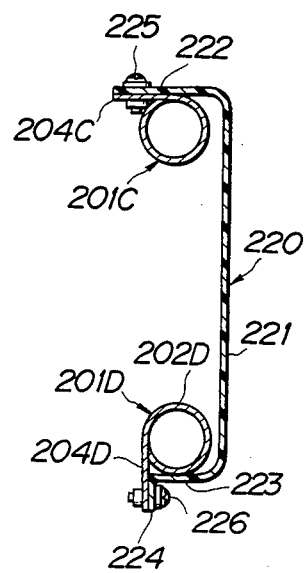
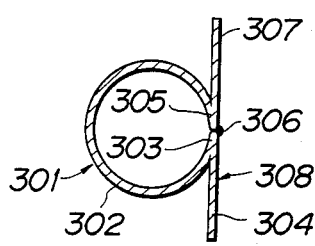
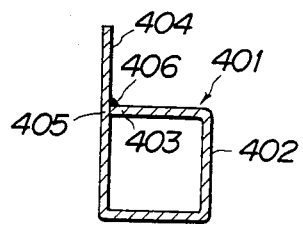
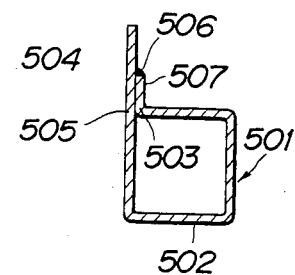

LIGHT-WEIGHT VEHICLE FRAME STRUCTURE

RELATED APPLICATION

This application is a continuation of my copending application Ser. No. 607,616 filed May 7, 1984, now abandoned.

BACKGROUND OF THE INVENTION

The present invention relates to a light-weight vehicle body and the method of construction of a light vehicle.

DESCRIPTION OF RELAVANT ART

In the art of light vehicles such as a motorcycle, an engine powered tricycle, and an engine powered four-wheeled vehicle, pipes are generally used for the entire frame of such vehicle. In a typical structural arrangement of such a vehicle in which the frame is covered with an outer cover plate or sheeting, there are employed a plurality of brackets secured to such pipes at convenient points thereon for supporting the cover plate, which is screwed or welded at points along the circumference thereof to the brackets, thereby firmly joining together the pipes and the cover plate.

In such conventional arrangement, the outer cover plate is thus jointed to the pipes merely by means of the plural brackets. Accordingly, the outer cover plate is not truly adapted to serve as a sufficient reinforcement member for the pipes or the frame.

There has been put to practical use a monocoque structure for motorcycle frames in which a steel plate is pressed and fabricated by welding into a cross-sectional box-shaped member. In such monocoque structure, the plate serves as a reinforcement member, and the box-shaped cross section provides a desired degree of mechanical strength. However, the production process for such monocoque structure requires a particular line including a large-sized press form and special welding jigs, thus requiring a large initial investment. Moreover, although this is not a serious problem in the mass production of vehicles, the production cost is quite high in small quantity and medium-quantity production.

The recent motorcycle market trend is such that an increasing number of types of motorcycles are made available to meet the variety of user's preferences and demands. Namely, there is a growing tendency toward the production of a larger number of motorcycle types in small or medium quantities, rather than the previously conventional mass production of a single type, and hence it is necessary to change the design of the outer cover plates and shapes depending on such variety of motorcycle types. In such a production system, however, the cost may become quite high because as many monocoque structures as there would be motorcycle types must be prepared. In such circumstances, pipes are widely utilized in the form of a structural member with desired mechanical strength, however, those pipes have a thick wall and large diameter, resulting in increased weight and cost of the frame and hence the motorcycle.

The present invention eliminates the foregoing problems attendant to conventional pipes used as a structural member adapted for light vehicles such as motorcycles and small three or four wheeled vehicles used for economic transportation or as off-road vehicles.

SUMMARY OF THE INVENTION

According to the present invention, there is provided vehicle structure employing a first structural member comprising a tubular body having a longitudinal axis and first and second edges extending along the longitudinal axis and first and second edges extending along the longitudinal axis and held in abutment against each other defining an inner elongate space in the tubular body, at least the first edge out of the first and second edges having a first flange integral therewith and extending outwardly of the tubular body, and a second structural member in the form of a plate or sheet connected to the flange of the first structural member.

Accordingly, it is an object of the present invention to provide a vehicle body with a structural member which allows an outer plate to serve as a reinforcement member in the vehicle body frame of a light vehicle, for example, reduces the weight of a vehicle body construction, and maintains a desired degree of mechanical strength of the vehicle body construction, thereby permitting light vehicles to be manufactured in medium or small quantities with increased efficiency.

The above and further features, objects and advantages of the present invention will more fully appear from the following detailed description of the preferred embodiments of the invention when the same is read in conjunction with the accompanying drawings.

BRIEF DESCRIPTION OF THE DRAWINGS

FIG. 4 is a cross-sectional view showing the manner in which structural members of FIG. 1 are used to form a vehicle body section of this invention.

FIG. 5 is a cross-sectional view of a structural member according to a second embodiment of the present invention.

FIG. 6 is a cross-sectional view of a structural member according to a third embodiment of the present invention.

FIG. 7 is a cross-sectional view showing one way in which structural members of FIG. 6 are used to form a vehicle body section of this invention.

FIG. 8 is a cross-sectional view showing another way in which structural members of FIG. 6 are used to form a vehicle body section of this invention.

FIG. 9 is a cross-sectional view of a structural member according to a fourth embodiment of the present invention.

FIG. 10 is a cross-sectional view of a structural member according to a fifth embodiment of the present invention.

FIG. 11 is a cross-sectional view of a structural member according to a sixth embodiment of the present invention.

DETAILED DESCRIPTION OF THE PREFERRED EMBODIMENTS

Figure 1:
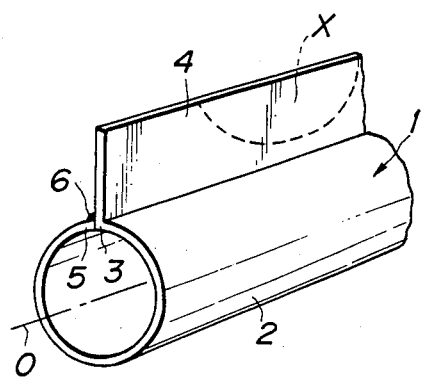
FIG. 1 is a fragmentary perspective view of a structural member according to a first embodiment of the present invention.
Figure 2:
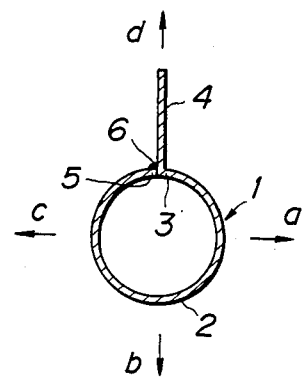
FIG. 2 is a cross-sectional view of the structural member shown in FIG. 1.

FIGS. 1 and 2 illustrate a structural member, generally designated by reference numeral 1, constituted in accordance with a first embodiment of the present invention. The structural member 1 comprises a tubular body 2 of a circular cross section having a longitudinal axis 0 and longitudinal edges of circumferential ends 3, 5 extending along the longitudinal axis 0 and held in abutment against each other, and a flange 4 integral with the edge 3 and extending radially outwardly from the tubular body 2. The edges 3, 5 extend along the entire length of the tubular body 2 and are joined to each other by a weld bead 6.

The structural member 1 has a cross-sectional shape as shown in FIG. 2, in which the flange 4 extends radially outwardly from the tubular body 2, the cross-sectional shape being uniform throughout the entire length of the structural member 1.

Where it is necessary to bend the structural member 1 for use, it can be bent in the direction of arrow a or c in the same manner as that in which conventional pipes are bent. When bending the structural member 1 in the direction of arrow b or d, it is preferable that a region or portion X of the flange 4 as shown in FIG. 1 is cut off, and the structural member 1 is bent about the cut-off portion.

A process of manufacturing the structural member 1 will be described with reference to FIGS. 3a through 3f.

Figures 3A, 3B:
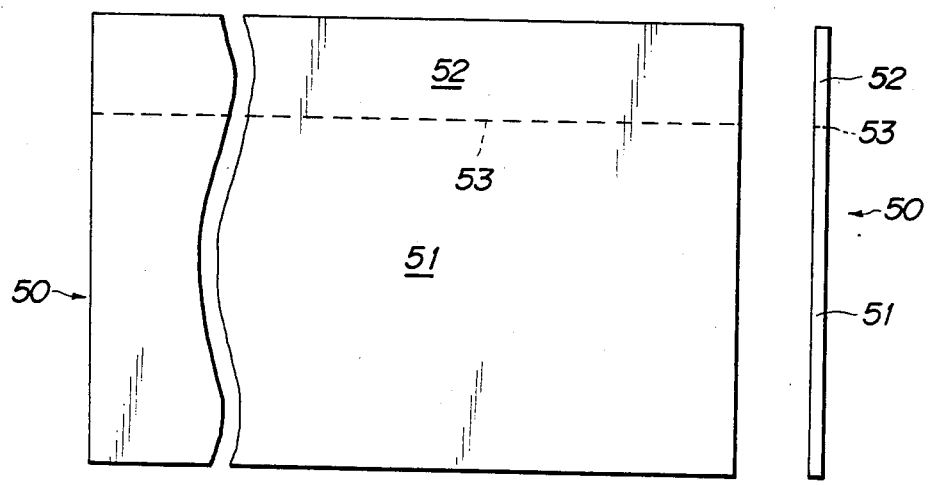
FIGS. 3a through 3f are views illustrative of progressive steps of manufacturing the structural member of FIG. 1.

At first, as shown in FIGS. 3a and 3b, a rectangular steel plate 50 is demarcated by an imaginary dividing line 53 into two rectangular regions 52, 51.

Figures 3C, 3D, 3E, 3F:
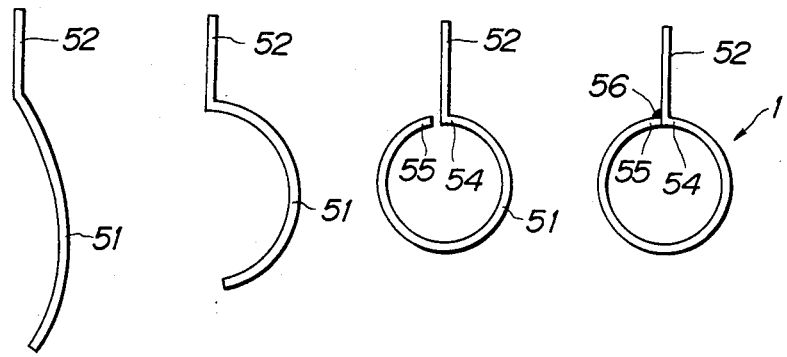

Then, as illustrated in FIGS. 3c through 3e, one of the rectangular regions 51 is rolled into a tubular body in a known manner.

Longitudinal edges or circumferential ends 54, 55 of the tubular body 51 as shown in FIG. 3e are brought into abutment against each other, and then joined to each other by a weld bead 56 along the entire length of the tubular body 51, the weld bead 56 being preferably formed by electric arc welding.

The weld may not be continuous but at spaced intervals providing the manufactured structural member has a sufficient degree of mechanical strength.

FIG. 4 shows in cross section a frame construction for a light vehicle, employing a pair of structural members as shown in FIGS. 1 and 2. The frame construction comprises upper and lower structural members 1A, 1B with their respective flanges 4A, 4B oriented upwardly and downwardly, respectively, and an outer plate 11 formed by pressing a steel plate and having a flat central portion 12. The outer plate 11 has upper and lower end flanges 13, 14 bent to be welded respectively to the flanges 4A, 4B. The outer plate 11 is mounted on and extends between the structural members 1A, 1B, and hence serves sufficiently as a reinforcement member in the frame construction.

Structural members in vehicle body frame constructions are spaced at appropriate intervals dependent on the vehicle body frame construction for the type of a light vehicles to be manufactured. An outer plate to be fused to the structural member is pressed by press dies dedicated for a particular vehicle type in a pattern according to an arrangement of structural members. Since pressed outer plates can individually be formed, unlike monocoque constructions, they are advantageous from the standpoint of the cost for manufacturing light vehicles in medium or small quantities. Furthermore, since the flange of the structural member reinforces the structural member, the structural member may be of a reduced thickness and a reduced diameter. The flange allows the outer plate serving as the reinforcement member to be easily fused to the structural member.

FIG. 5 shows in cross section a structural member 101 according to a second embodiment of the present invention. The structural member 101 comprises a tubular body 102 of a circular cross section having longitudinal edges or circumferential ends 103, 105, and flanges 104, 107 integral with the edges 103, 105, respectively, and extending radially outwardly from the tubular body 102. The flanges 104, 107 extend along the entire length of the tubular body 102 and are joined to each other by a weld bead 106. The structural member 101 can be manufactured by demarcating a rectangular steel plate into three rectangular regions, rolling the central region into a tubular body 102, bringing longitudinal edges or circumferential ends 103, 105 of the tubular body 102 into mutual abutment, and joining, with a weld bead 106 along the entire length of the structural member 101, one of the unrolled rectangular regions serving as a main flange 104 and the other unrolled rectangular region serving as a subflange 107.

FIG. 6 shows in cross section a structural member 201 according to a third embodiment of the present invention. The structural member 201 comprises a tubular body 202 of a circular cross section having longitudinal edges or circumferential ends 203, 205, and a flange 204 integral with one of the edges 203 and extending radially outwardly from the tubular body 202 in tangential relation thereto. The edges 203, 205 are joined to each other by a weld bead 206 along the entire length of the tubular body 202. The structural member 201 can be manufactured by demarcating a rectangular steel plate into two rectangular regions, rolling one of the regions into a tubular body 202 with one edge bevelled at about 45°, bringing the bevelled edge 205 into abutment against a proximal edge 203 of a flange 204 of the other rectangular region, and joining the edges 203, 205 to each other with a weld bead 206 along the entire length of the structural member 201.

FIG. 7 shows in cross section a frame construction for a light vehicle, employing structural members as shown in FIG. 6. In FIG. 7, the interior of a vehicle body is shown on the lefthand side, and the exterior of the vehicle body is shown on the righthand side. The frame construction comprises upper and lower structural members 201A, 201B with their respective flanges 204A, 204B oriented into the interior of the vehicle body and downwardly, respectively, and an outer plate 211 formed by pressing a steel plate and having a slightly bent central portion 212. The outer plate 211 has upper and lower end flanges 213, 214 bent into the interior of the vehicle body and downwardly, respectively, and fused respectively to an upper surface of the flange 204A and an outer surface of the flange 204B. The outer plate 211 is mounted on and extends between the structural members 201A, 201B, and hence serves sufficiently as a reinforcement member in the frame construction.

FIG. 8 shows in cross section another frame construction for a light vehicle, employing structural members as shown in FIG. 6. The frame construction comprises upper and lower structural members 201C, 201D, the upper structural member 201C being arranged in the same manner as that in which the structural member 201A is arranged. The lower structural member 201D has a flange 204D oriented downwardly and positioned inwardly of a tubular body 202D. An outer plate 220 made of synthetic resin has a flat central portion 221, an upper end flange 222 bent into the interior of the vehicle body in mating engagement with the flange 204C, and a lower end flange 223 bent into the interior of the vehicle body in mating engagement with the flange 204D and having a downwardly bent marginal edge 224. The upper end flange 222 is overlapped on the flange 204C and fastened thereto by screw members 225. The lower end flange 223 and the marginal edge 224 thereof are held in abutment against the tubular body 202D and the flange 204D of the structural member 201D, the marginal edge 224 being fastened to the flange 204D by screw members 226.

FIG. 9 shows in cross section a structural member 301 according to a fourth embodiment of the present invention. The structural member 301 comprises a tubular body 302 of a circular cross section having longitudinal edges or circumferential ends 303, 305, and flanges 304, 307 integral with the edges 303, 305, respectively, and extending tangentially to the tubular body 302 in direction away from each other. The flanges 304, 307 jointly serve as a flat flange 308 having a width greater than the diameter of the tubular body 302. The edges 303, 305 extend along the entire length of the tubular body 302 and are joined to each other by a weld bead 306. The structural member 301 can be manufactured by demarcating a rectangular steel plate into three rectangular regions, rolling the central region into a tubular body 302, bringing longitudinal edges or circumferential ends 303, 305 of the tubular body 302 into mutual abutment, holding the unrolled rectangular regions serving respectively as first and second flanges 304, 307 in a manner to jointly provide a flat flange 308 extending tangentially to the tubular body 302 and having a width greater than the diameter of the tubular body 302, and joining the edges 303, 305 to each other with a weld bead 306 along the entire length of the structural member 301. Although in the illustrated embodiment of FIG. 9, the first and second flanges 304, 307 are shown as being of the same width, they may have different widths.

FIG. 10 shows in cross section a structural member 401 according to a fifth embodiment of the present invention. The structural member 204 comprises a tubular body 402 of square cross section having longitudinal edges or circumferential ends 403, 405 jointly forming one corner of the tubular body 402, and a flange 404 integral with one of the edges 405 and extending as an extension of one side of the square having the edge 405. The edges 403, 405 are joined to each other by a weld bead 406 along the entire length of the tubular body 402. The structural member 401 can be manufactured by demarcating a rectangular steel plate into two rectangular regions, forming one of the regions into a tubular body 402 of a square cross section, and joining an edge 405 serving as a proximal portion of a flange 404 which is the other rectangular region, not bent to shape, and an extension of one side of the square, to an edge 403 with a weld bead 406 along the entire length of the structural member 401. The tubular body 401 may be of a rectangular cross section.

FIG. 11 shows in cross section a structural member 501 according to a sixth embodiment of the present invention. The structural member 501 comprises a tubular body 502 of a square cross section having longitudinal edges or circumferential ends 503, 505 jointly defining one corner of the tubular body 502, and a flange 504 integral with one of the edges 505 and extending as an extension of one side of the square having the edge 505, and a flange 507 integral with the other edge 503 and extending in the same direction as that in which the flange 504 extends, the flange 507 being shorter than the flange 504. The flanges 504, 507 extend along the entire length of the tubular body 502 and are joined to each other by a weld bead 506 at an outer edge of the flange 507. The structural member 501 can be manufactured by demarcating a rectangular steel plate into three rectangular regions, forming the central region into a tubular body 502 of a square cross section, and joining, with a weld bead 506 along the entire length of the structural member 501, one of the rectangular regions, not bent to shape, serving as a main flange 504 and the other rectangular region serving as a subflange 507 shorter than the main flange 504.

The pipes constituting the structural members may be rectangular, elliptical, triangular, or otherwise polygonal in cross section, as well as circular.

Although in the embodiments the flanges extend axially the full length of the structural members, unwanted portions of the flanges may be removed or omitted so that only required portions thereof may be left.

Figure 12:
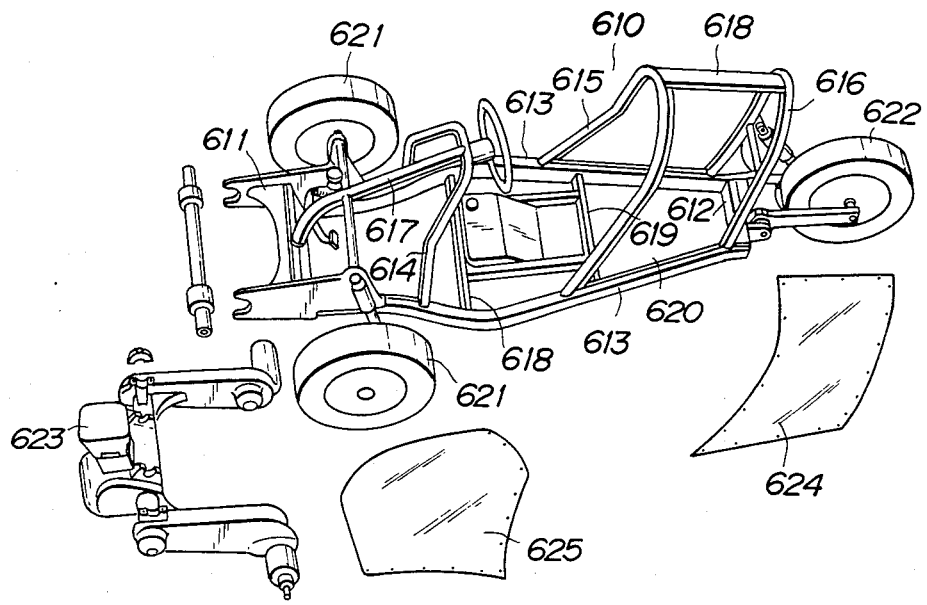
FIG. 12 is an exploded perspective view of a frame construction of a light vehicle employing the structural members illustrated in FIGS. 1, 2 and 9 in a typical embodiment of the present invention.
Figure 13:
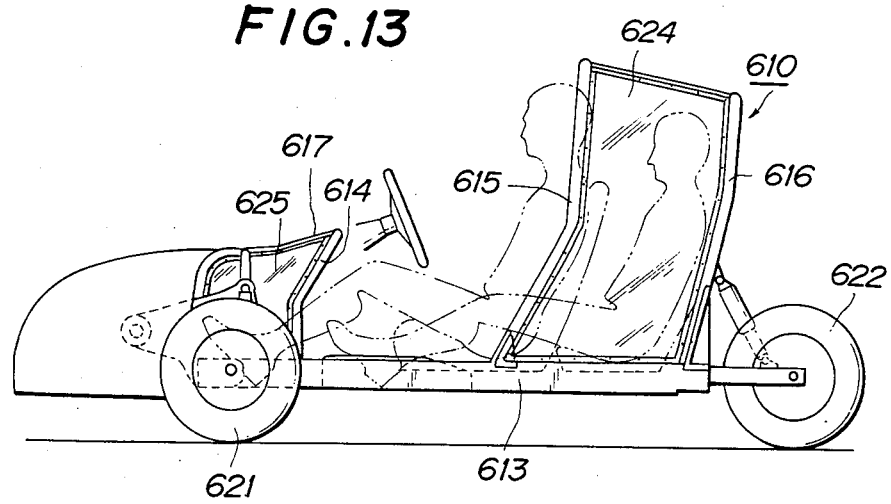
FIG. 13 is a side elevational view of the frame construction of the light vehicle shown in FIG. 12.

FIG. 12 illustrates a frame construction 610 of a three-wheeled vehicle using structural members according to the present invention. The frame construction 610 extends in the longitudinal direction of the vehicle, and comprises laterally spaced main frame members 613, 613 connected at a front end by a front cross member 611 and at a rear end by a rear cross member 612, and three arcuate subframes 614, 615, 616 of an inverted U shape which have lower ends coupled to the main frame members 613, 613. A front middle frame member 617 extends between a top middle portion of the subframe 614 and a middle portion of the front cross member 611, and a rear reinforcement member 618 extends between top middle portions of the subframes 615, 616. Between the main frame members 613, 613, there extends central cross members 618, 618 substantially centrally in the longitudinal direction of the vehicle. A floor 620 also extends between the main frame members 613, 613. A longitudinal brace 618a extends between the upper extremities of the subframes 615 and 616. Laterally spaced front wheels 621, 621 are rotatably mounted on a front portion of the frame construction 610, and a rear wheel 622 is rotatably mounted on a rear end of the frame construction 610. A power unit 623 is also mounted on the front portion of the frame construction 610. The subframes 614, 615, 616 are composed of structural members according to the first embodiment shown in FIGS. 1 and 2, and the front middle frame member 617 is composed of a structural member according to the fourth embodiment shown in FIG. 9. A vehicle body outer plate 624 is mounted on the frame construction at its rear portion by being attached to the flanges of the subframes 615, 616, and a front cover 625 is mounted on the frame construction at its front portion by being attached to the flanges of the subframe 614 and the frame member 617.

The outer and cover plates of the light vehicle can therefore be attached easily to the flanges of the structural members of the frame construction. Where the outer and cover plates are made of synthetic resin, they may be secured by screw members, and where they are made of steel plates, they may be welded to the flanges. Where the outer and cover plates are of synthetic resin, they may alternatively be held in engagement with the flanges of the structural members.

With the arrangement of the present invention, a structural member has a sufficient degree of mechanical strength and rigidity, is of a reduced thickness, a light weight, a small diameter, and will allow a vehicle body outer plate to be used as a reinforcement member for a vehicle body frame construction of a light vehicle when the structural member is employed as a member constituting the vehicle body frame construction. The vehicle frame construction thus assembled is similar to a monocoque construction. Since a flange by which the outer frame will be attached to the frame construction is formed at the time of manufacturing the structural member, the procedure for attaching the vehicle body outer plate to the vehicle body frame construction is easier than a conventional process in which brackets for attachment of an outer plate have been secured to a frame construction after the latter was manufactured.

Since the structural member of the invention can easily be bent in the same manner in which prior pipes are bent, a vehicle body frame can easily be constructed dependent on the type of a light vehicle to be manufactured. Furthermore, the vehicle body frame construction using structural members of the invention can be of the same mechanical strength as that of monocoque constructions, so that many types of light vehicles can be produced in medium or small quantities with an increased degree of efficiency.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed:

1. A light-weight vehicle frame structure including a first structural member having a metal tubular body having a longitudinal axis and first and second edges held in substantial abutment against each other in a cross section substantially perpendicular to said longitudinal axis; a first flange integrally continuous to said first edge and extending outwardly of said tubular body up to a first length at least greater than zero; a second flange integrally continuous to said second edge and extending outwardly of said tubular body up to a second length equal to or greater than zero; an outer edge of said second flange and said second edge being fused to a portion of said first flange and said first edge, respectively; said metal tubular structural member having a uniform cross section along said longitudinal axis; and a second structural member of a planar shape and having a portion extending coplanar with and attached to one of said first and second flanges.

2. A vehicle frame structure according to claim 1, wherein: said first and second edges of said first structural member are welded to each other along an entire length of said tubular body in a direction of said longitudinal axis, said first flange being integral with said first edge.

3. A vehicle frame structure according to claim 1, wherein: said tubular body has a circular cross section, and said first flange extends radially outwardly from said tubular body.

4. A vehicle frame structure according to claim 1, wherein: said tubular body has a circular cross section, and said first flange extends tangentially to said tubular body.

5. A vehicle frame structure according to claim 1, wherein: said tubular body has a square cross section, and said first flange extends as an extension of one side of said square cross section having said first edge.

6. A vehicle frame structure according to claim 1, wherein: said tubular body having a circular cross section, and said first and second flanges extend in directions away from each other in tangential relation to said tubular body and jointly defining a flat flange extending tangentially to said tubular flange.

7. A vehicle frame structure according to claim 1, wherein: said first flange is integral with said first edge and extends outwardly of said tubular body, said second flange is integral with said second edge and extends in a direction in which said first flange extends, said second flange being shorter than said first flange, and said second flange having an outer edge welded to said first flange along an entire length of said tubular body in an axis of said longitudinal axis.

8. A vehicle frame structure according to claim 1, wherein: said tubular body has a circular cross section, and each of said first and second flanges extends radially outwardly from said tubular body.

9. A vehicle frame structure member according to claim 1, wherein: said tubular body has a square cross section, and said first flange extends as an extension of one side of said square cross section having said first edge.

* * * * *